(12) United States Patent
Englander et al.

(10) Patent No.: US 12,441,248 B2
(45) Date of Patent: Oct. 14, 2025

(54) DOWNLIGHTING SIGNAL AND ILLUMINATION MIRROR HEAD FOR VEHICLE

(71) Applicant: ROSCO, INC., Jamaica, NY (US)

(72) Inventors: Benjamin Englander, Woodmere, NY (US); Julian Serer, Plainview, NY (US); Racquel Glickman, Woodmere, NY (US); Michael Lipani, Cold Spring Harbor, NY (US)

(73) Assignee: Rosco, INC., Jamaica, NY (US)

( * ) Notice: Subject to any disclaimer, the term of this patent is extended or adjusted under 35 U.S.C. 154(b) by 0 days.

(21) Appl. No.: 18/913,792

(22) Filed: Oct. 11, 2024

(65) Prior Publication Data

US 2025/0033564 A1     Jan. 30, 2025

Related U.S. Application Data

(63) Continuation of application No. 17/649,437, filed on Jan. 31, 2022, now Pat. No. 12,115,916.
(Continued)

(51) Int. Cl.
*B60R 1/12*     (2006.01)
*B60Q 1/00*     (2006.01)
(Continued)

(52) U.S. Cl.
CPC .......... *B60R 1/1207* (2013.01); *B60Q 1/0088* (2013.01); *B60Q 1/2665* (2013.01);
(Continued)

(58) Field of Classification Search
CPC .. B60R 1/1207; B60Q 1/0088; B60Q 1/2665; B60Q 1/2696; B60Q 1/32; F21V 19/003; F21V 23/06
See application file for complete search history.

(56) References Cited

U.S. PATENT DOCUMENTS 1,110,973 A    9/1914   Tischler
1,719,821 A    7/1929   Alexander
(Continued)

FOREIGN PATENT DOCUMENTS

GB    2293151    3/1996
JP     551635    4/1980
(Continued)

OTHER PUBLICATIONS

Office Action issued to a Canadian counterpart application No. 3,147,386 dated Dec. 28, 2023.

*Primary Examiner* — Bryon T Gyllstrom
(74) *Attorney, Agent, or Firm* — Manatt, Phelps & Phillips, LLP

(57) ABSTRACT

A mirror assembly for vehicle is disclosed. The mirror assembly includes three configurations of extra illumination to the passenger loading area in addition to the typical mirror function for providing the vehicle driver the rear and/or side view of the vehicle. In some embodiments, the mirror assembly comprises two clam shells, and/or a lighting pod and/or two mirror heads that are supported by a supporting arm. In some embodiments, the mirror assembly is mounted on the school bus through the clam shells. In addition, a side lighting device is mounted on the right side of the vehicle for providing extra illumination to the passenger loading area.

20 Claims, 12 Drawing Sheets

Related U.S. Application Data

(60) Provisional application No. 63/144,396, filed on Feb. 1, 2021.

(51) Int. Cl.

| | | |
|---|---|---|
| *B60Q 1/26* | (2006.01) | |
| *B60Q 1/32* | (2006.01) | |
| *B60Q 1/34* | (2006.01) | |
| *B60Q 1/46* | (2006.01) | |
| *B60Q 1/48* | (2006.01) | |
| *B60Q 1/50* | (2006.01) | |
| *F21V 19/00* | (2006.01) | |
| *F21V 23/06* | (2006.01) | |
| *F21W 102/40* | (2018.01) | |

(52) U.S. Cl.
CPC ............ *B60Q 1/2696* (2013.01); *B60Q 1/32* (2013.01); *F21V 19/003* (2013.01); *F21V 23/06* (2013.01); *B60Q 1/34* (2013.01); *B60Q 1/46* (2013.01); *B60Q 1/48* (2013.01); *B60Q 1/50* (2013.01); *F21W 2102/40* (2018.01)

(56) References Cited

U.S. PATENT DOCUMENTS

| | | |
|---|---|---|
| 1,768,354 A | 6/1930 | Faige |
| 1,810,435 A | 6/1931 | Paulson |
| 1,973,847 A | 9/1934 | De Orlow |
| 2,143,281 A | 1/1939 | Sauer |
| 2,176,723 A | 10/1939 | Sauer |
| 2,447,786 A | 8/1948 | Anderson |
| 2,455,919 A | 12/1948 | Daon |
| 2,458,117 A | 1/1949 | Tolbert |
| 2,533,867 A | 12/1950 | Zink |
| 2,545,777 A | 3/1951 | Hardin |
| 2,596,632 A | 5/1952 | Whitehead |
| 2,616,648 A | 11/1952 | Frances |
| 2,778,273 A | 1/1957 | Fellmeth |
| 2,857,810 A | 10/1958 | Troendle |
| 2,860,546 A * | 11/1958 | Bolser ............... B60R 1/0617 248/477 |
| 2,869,425 A | 1/1959 | Kershaw |
| 3,003,396 A | 10/1961 | Jenkins |
| 3,596,079 A * | 7/1971 | Clark ............... B60Q 1/2665 362/144 |
| 3,608,856 A * | 9/1971 | Hurley ............... B60R 1/0605 248/230.8 |
| 4,258,983 A * | 3/1981 | Johnson ............... B60R 1/0605 359/872 |
| 4,331,382 A | 5/1982 | Graff |
| 4,436,372 A | 3/1984 | Schmidt et al. |
| 4,449,786 A | 5/1984 | McCord |
| 4,580,881 A | 4/1986 | Kim |
| 4,730,914 A | 3/1988 | Stout |
| 4,730,926 A | 3/1988 | Wedemeyer |
| 4,822,157 A | 4/1989 | Stout |
| 4,938,578 A | 7/1990 | Schmidt et al. |
| 5,005,963 A | 4/1991 | Schmidt et al. |
| 5,084,785 A | 1/1992 | Albers et al. |
| D346,357 S | 4/1994 | Englander |
| 5,307,211 A | 4/1994 | Schmidt et al. |
| 5,321,556 A | 6/1994 | Joe |
| 5,432,509 A | 7/1995 | Kajiwara |
| 5,446,509 A | 8/1995 | Okinishi |
| 5,515,026 A | 5/1996 | Ewert |
| 5,589,984 A | 12/1996 | Schmidt et al. |
| 5,611,200 A | 3/1997 | Moenkhaus |
| 5,690,421 A | 11/1997 | Shea |
| 5,825,177 A | 10/1998 | Finnestad |
| 5,942,993 A | 8/1999 | Mio |
| 6,011,518 A | 1/2000 | Yamagishi |
| 6,015,215 A | 1/2000 | Herman |
| 6,030,084 A | 2/2000 | Schmidt |
| 6,035,053 A | 3/2000 | Yoshioka |
| 6,069,755 A | 5/2000 | Li et al. |
| 6,223,125 B1 | 4/2001 | Hall |
| 6,227,674 B1 * | 5/2001 | Englander ............... B60R 1/082 359/853 |
| 6,282,771 B2 | 9/2001 | Englander |
| 6,293,679 B1 | 9/2001 | Schmidt |
| 6,326,903 B1 | 12/2001 | Gross |
| 6,328,450 B2 | 12/2001 | Englander |
| 6,337,637 B1 | 1/2002 | Kubota |
| 6,398,377 B1 | 6/2002 | Chou |
| 6,588,911 B1 | 7/2003 | Martinez |
| 6,962,420 B2 * | 11/2005 | Branham ............... B60R 1/0617 359/881 |
| 7,012,761 B1 | 3/2006 | Schmidt et al. |
| 7,084,859 B1 | 8/2006 | Pryor |
| 7,134,759 B2 | 11/2006 | Schmidt et al. |
| 7,172,301 B2 | 2/2007 | Ito |
| 7,234,825 B2 | 6/2007 | Meng |
| 7,241,020 B2 | 7/2007 | Schmidt et al. |
| 7,252,398 B2 * | 8/2007 | Englander ............ G11B 5/5552 359/872 |
| 7,267,384 B1 | 9/2007 | Coviello |
| 7,267,448 B2 | 9/2007 | Schmidt et al. |
| 7,375,622 B2 | 5/2008 | Takata |
| 7,517,100 B2 | 4/2009 | Englander et al. |
| 7,547,108 B2 | 6/2009 | Schmidt et al. |
| 7,667,581 B2 | 2/2010 | Fujimoto |
| 7,780,301 B2 | 8/2010 | Englander et al. |
| 7,832,882 B2 | 11/2010 | Weller |
| 7,918,569 B2 | 4/2011 | Schmidt |
| 8,047,666 B2 | 11/2011 | Englander et al. |
| 8,132,845 B2 | 3/2012 | Kinoshita |
| 8,164,432 B2 | 4/2012 | Broggi |
| 8,248,363 B2 | 8/2012 | Anastas |
| 8,352,173 B2 | 1/2013 | Greene |
| 8,471,691 B2 | 6/2013 | Zhang |
| 8,482,534 B2 | 7/2013 | Pryor |
| 8,482,535 B2 | 7/2013 | Pryor |
| 8,509,523 B2 | 8/2013 | Schamp |
| 8,520,070 B1 | 8/2013 | Englander |
| 8,538,636 B2 | 9/2013 | Breed |
| 8,547,249 B2 | 10/2013 | David |
| 8,573,791 B2 | 11/2013 | Schmidt |
| 8,583,329 B2 | 11/2013 | Breed |
| 8,589,061 B2 | 11/2013 | Bengtsson |
| 8,610,674 B2 | 12/2013 | Pryor |
| 8,666,651 B2 | 3/2014 | Kumabe |
| 8,672,494 B2 | 3/2014 | Englander |
| 8,899,764 B2 | 12/2014 | Ung |
| 8,952,799 B2 | 2/2015 | Irrgang |
| 9,047,781 B2 | 6/2015 | Geter |
| 9,048,960 B2 | 6/2015 | Li |
| 9,201,842 B2 | 12/2015 | Plante |
| 9,227,568 B1 | 1/2016 | Lesesky |
| 9,239,380 B2 | 1/2016 | Hegemann |
| 9,302,625 B2 | 4/2016 | Englander |
| 9,330,321 B2 | 5/2016 | Schamp |
| 9,387,897 B2 | 7/2016 | Orzeck |
| 9,511,714 B2 | 12/2016 | Schmidt |
| 9,604,575 B2 | 3/2017 | Englander |
| 9,663,037 B2 * | 5/2017 | Randleman ............ B60R 1/0605 |
| 9,718,405 B1 | 8/2017 | Englander |
| 9,796,335 B2 | 10/2017 | Englander |
| 9,802,544 B2 | 10/2017 | Schmidt |
| 9,908,470 B1 | 3/2018 | Englander |
| 10,035,460 B2 | 7/2018 | Englander |
| 10,286,844 B1 | 5/2019 | Schmidt |
| 10,525,888 B1 | 1/2020 | Englander |
| 10,556,543 B2 | 2/2020 | Schmidt |
| 10,821,898 B1 * | 11/2020 | Englander ............ B60R 1/0617 |
| 11,066,017 B1 | 7/2021 | Schmidt |
| 12,115,916 B2 | 10/2024 | Englander |
| 2002/0003571 A1 | 1/2002 | Schofield et al. |
| 2002/0027186 A1 | 3/2002 | Lang |
| 2002/0064052 A1 | 5/2002 | Abalos et al. |
| 2002/0089753 A1 | 7/2002 | Englander |
| 2002/0113876 A1 | 8/2002 | Kim |
| 2002/0159169 A1 | 10/2002 | McCord |

(56) References Cited

U.S. PATENT DOCUMENTS

| | | | |
|---|---|---|---|
| 2003/0116690 A1* | 6/2003 | Frazier | B60R 1/0617 |
| | | | 248/479 |
| 2003/0169521 A1 | 9/2003 | Hoegh | |
| 2004/0150515 A1 | 8/2004 | Kallhammer et al. | |
| 2004/0206611 A1 | 10/2004 | Kobayashi | |
| 2005/0161573 A1 | 7/2005 | Schmidt et al. | |
| 2005/0174429 A1 | 8/2005 | Yanai | |
| 2005/0180034 A1 | 8/2005 | Schmidt et al. | |
| 2005/0190260 A1 | 9/2005 | Xie | |
| 2005/0201590 A1 | 9/2005 | Kudo | |
| 2005/0278088 A1 | 12/2005 | Thorner | |
| 2006/0023323 A1 | 2/2006 | Meng | |
| 2006/0186702 A1 | 8/2006 | Kisanuki et al. | |
| 2006/0187669 A1* | 8/2006 | Englander | B60R 1/0605 |
| | | | 362/478 |
| 2006/0271286 A1 | 11/2006 | Rosenberg | |
| 2007/0008635 A1 | 1/2007 | Schmidt et al. | |
| 2007/0024433 A1 | 2/2007 | Garner | |
| 2007/0030582 A1 | 2/2007 | Schmidt | |
| 2007/0229238 A1 | 10/2007 | Boyles et al. | |
| 2007/0257783 A1 | 11/2007 | Matsumoto | |
| 2008/0030311 A1 | 2/2008 | Dayan et al. | |
| 2008/0036576 A1 | 2/2008 | Stein | |
| 2008/0042878 A1 | 2/2008 | Heng | |
| 2008/0049106 A1 | 2/2008 | Kallhammer et al. | |
| 2008/0079553 A1 | 4/2008 | Boice | |
| 2008/0100938 A1 | 5/2008 | Englander | |
| 2008/0119993 A1 | 5/2008 | Breed | |
| 2008/0294315 A1 | 11/2008 | Breed | |
| 2008/0316011 A1 | 12/2008 | Kirsch | |
| 2009/0015954 A1 | 1/2009 | Englander et al. | |
| 2009/0096937 A1 | 4/2009 | Bauer | |
| 2009/0115890 A1 | 5/2009 | Bertollo Conte | |
| 2009/0161379 A1* | 6/2009 | Liesener | B60Q 1/2665 |
| | | | 362/494 |
| 2009/0167512 A1 | 7/2009 | Iwamoto | |
| 2010/0001897 A1 | 1/2010 | Lyman | |
| 2010/0079883 A1* | 4/2010 | Englander | B60R 1/1207 |
| | | | 359/872 |
| 2010/0194596 A1 | 8/2010 | Nang et al. | |
| 2010/0231716 A1 | 9/2010 | Klaerner et al. | |
| 2010/0296705 A1 | 11/2010 | Miksa et al. | |
| 2011/0018832 A1 | 1/2011 | Pryor | |
| 2011/0032203 A1 | 2/2011 | Pryor | |
| 2011/0173565 A1 | 7/2011 | Ofek et al. | |
| 2011/0184617 A1 | 7/2011 | Hegemann | |
| 2011/0254956 A1 | 10/2011 | Ishikawa | |
| 2012/0026616 A1 | 2/2012 | Rawlings | |
| 2012/0062743 A1 | 3/2012 | Lynam et al. | |
| 2012/0134036 A1 | 5/2012 | Englander et al. | |
| 2012/0154591 A1 | 6/2012 | Baur et al. | |
| 2012/0235805 A1 | 9/2012 | Nogami et al. | |
| 2012/0290169 A1 | 11/2012 | Zeng | |
| 2012/0314074 A1 | 12/2012 | Aimura et al. | |
| 2013/0103259 A1 | 4/2013 | Eng | |
| 2013/0253754 A1 | 9/2013 | Ferguson et al. | |
| 2013/0279308 A1 | 10/2013 | Helm | |
| 2013/0321628 A1 | 12/2013 | Eng | |
| 2013/0328673 A1 | 12/2013 | Ishikawa | |
| 2014/0002651 A1 | 1/2014 | Plante | |
| 2014/0016216 A1 | 1/2014 | Mori et al. | |
| 2014/0056441 A1 | 2/2014 | Chhaunker | |
| 2014/0218529 A1 | 8/2014 | Mahmoud et al. | |
| 2014/0222280 A1 | 8/2014 | Salomonsson et al. | |
| 2014/0223787 A1 | 8/2014 | Richmond | |
| 2014/0376119 A1 | 12/2014 | Sobecki et al. | |
| 2015/0014380 A1 | 1/2015 | Oyama et al. | |
| 2015/0015713 A1 | 1/2015 | Wang et al. | |
| 2015/0091740 A1 | 4/2015 | Bai et al. | |
| 2015/0109149 A1 | 4/2015 | Duncan et al. | |
| 2015/0146919 A1 | 5/2015 | Ryu et al. | |
| 2015/0160340 A1 | 6/2015 | Grauer et al. | |
| 2015/0172631 A1 | 6/2015 | Kasahara | |
| 2015/0220793 A1 | 8/2015 | Kiyohara et al. | |
| 2015/0228066 A1 | 8/2015 | Farb | |
| 2015/0232065 A1 | 8/2015 | Ricci et al. | |
| 2015/0296200 A1 | 10/2015 | Grauer et al. | |
| 2015/0307026 A1 | 10/2015 | Minikey | |
| 2015/0332563 A1 | 11/2015 | Davis | |
| 2015/0347830 A1 | 12/2015 | Nakata et al. | |
| 2016/0001704 A1 | 1/2016 | Nakasho et al. | |
| 2016/0006908 A1 | 1/2016 | Pan et al. | |
| 2016/0018228 A1 | 1/2016 | Parker et al. | |
| 2016/0050342 A1 | 2/2016 | Kimura et al. | |
| 2016/0054644 A1 | 2/2016 | Samardzic et al. | |
| 2016/0075332 A1 | 3/2016 | Edo-Ros | |
| 2016/0086040 A1 | 3/2016 | Kuehnle et al. | |
| 2016/0120403 A1 | 5/2016 | Mochizuki et al. | |
| 2016/0125246 A1 | 5/2016 | Ryhorchuk et al. | |
| 2016/0191863 A1 | 6/2016 | Minikey | |
| 2016/0200275 A1 | 7/2016 | Le Merrer | |
| 2017/0080865 A1 | 3/2017 | Schmidt | |
| 2017/0210282 A1 | 7/2017 | Rodriguez Barros | |

FOREIGN PATENT DOCUMENTS

| | | |
|---|---|---|
| JP | 57186553 A | 11/1982 |
| JP | 08188088 A | 7/1996 |
| JP | 0976821 A | 3/1997 |

\* cited by examiner

DETAIL C

DETAIL A

DETAIL B

DETAIL E

DETAIL F

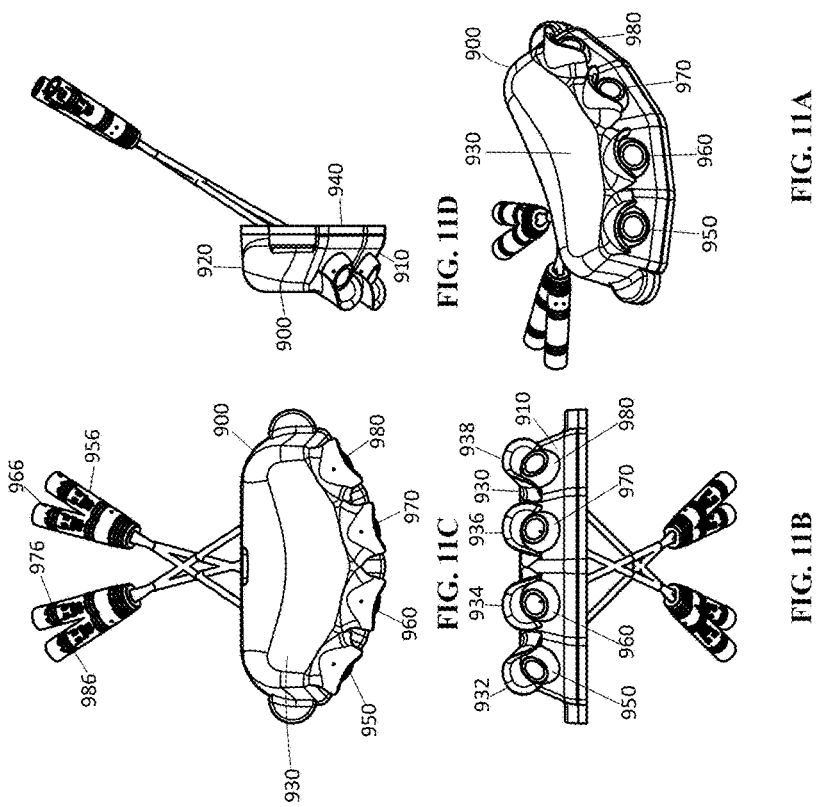
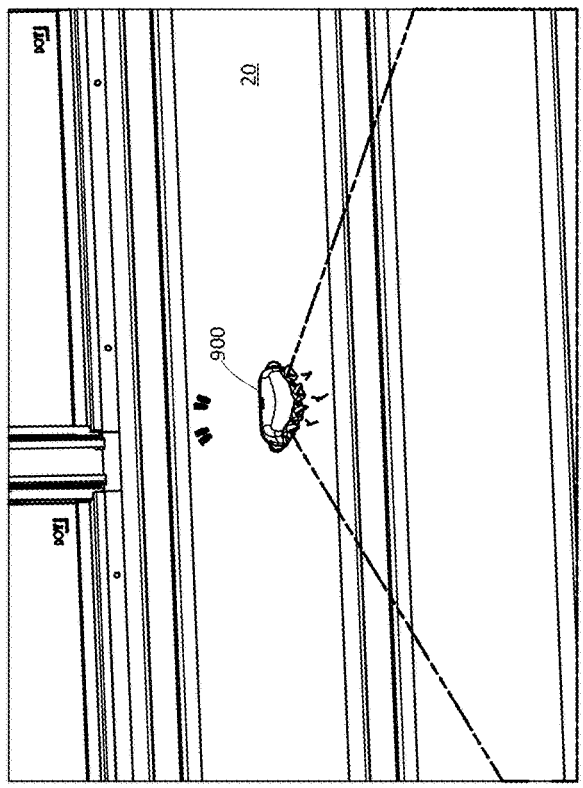
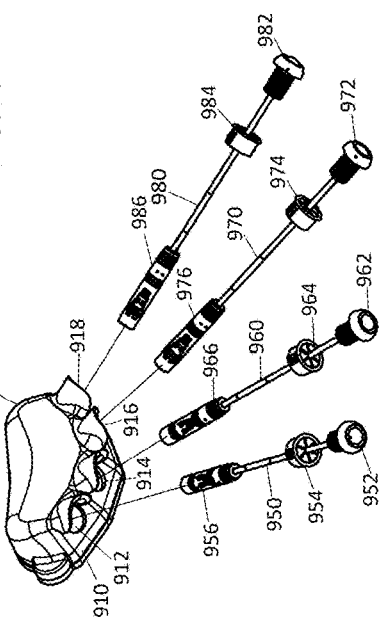

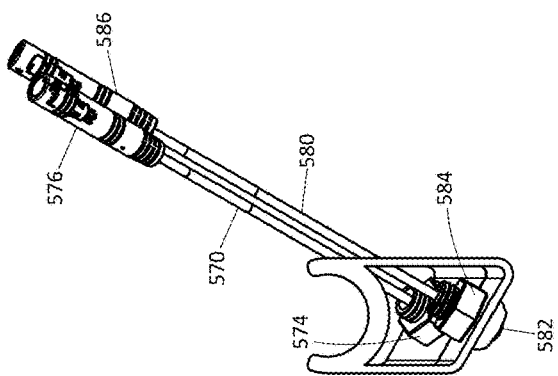
FIG. 14A
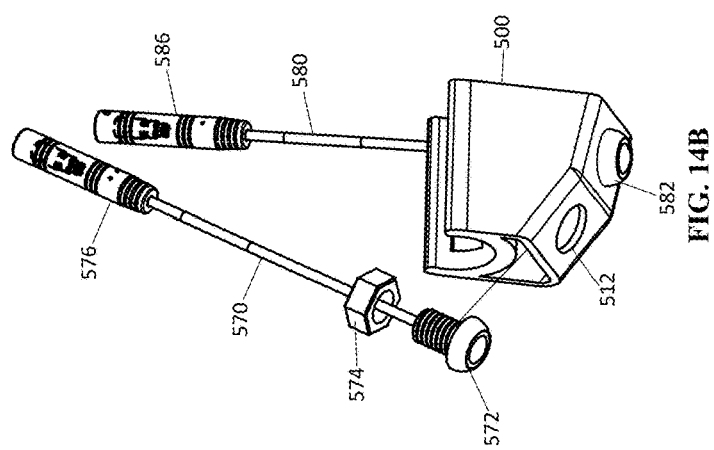
FIG. 14B
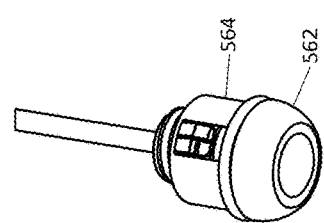
FIG. 13A
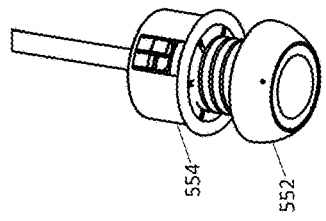
FIG. 13B
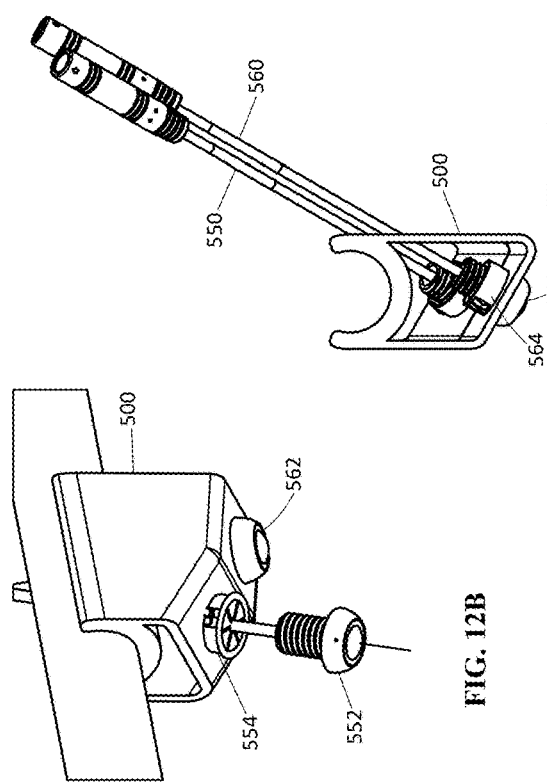
FIG. 12C
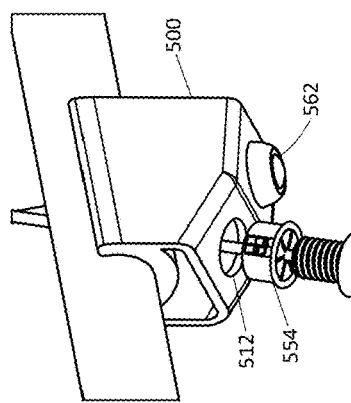
FIG. 12A
FIG. 12B

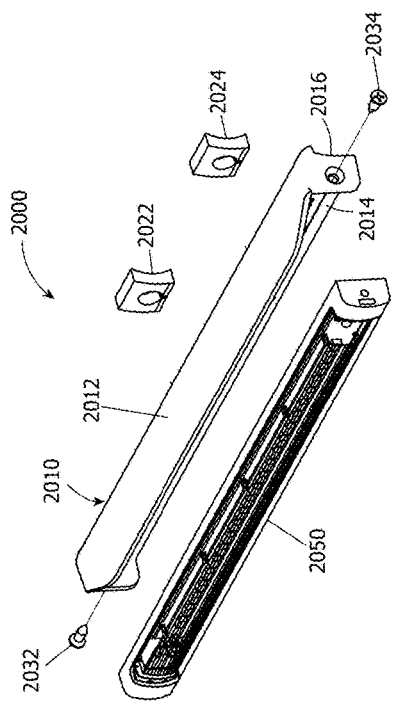
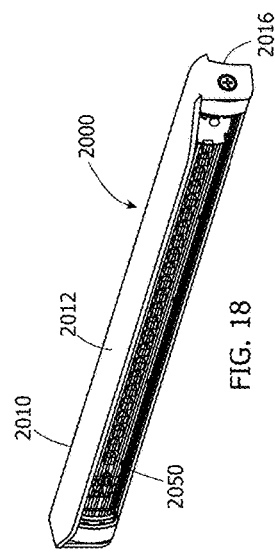
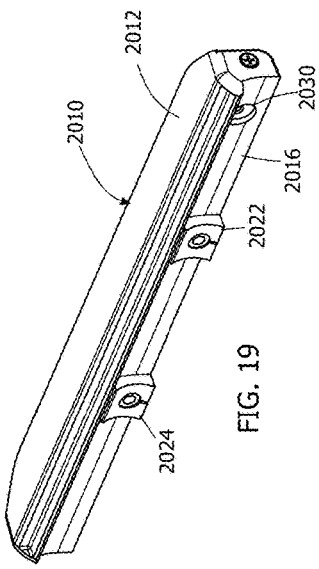
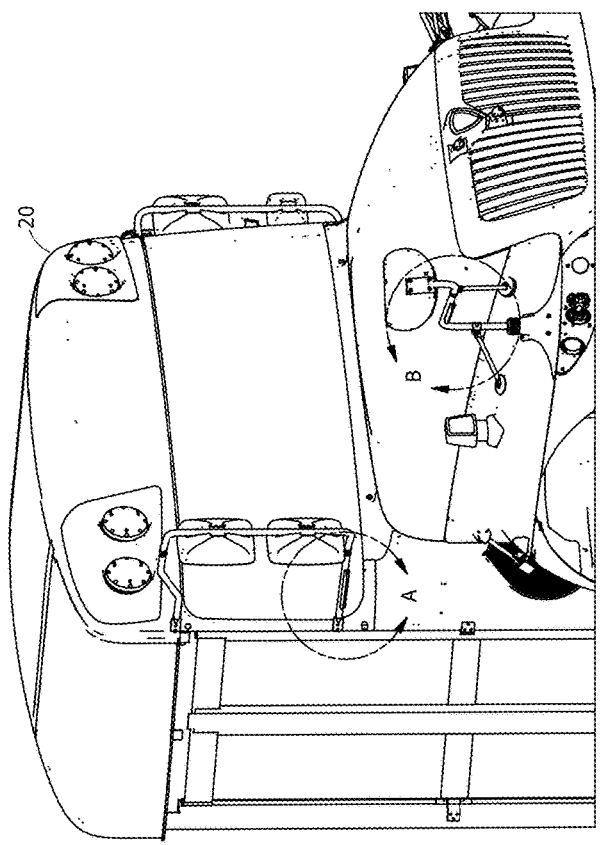
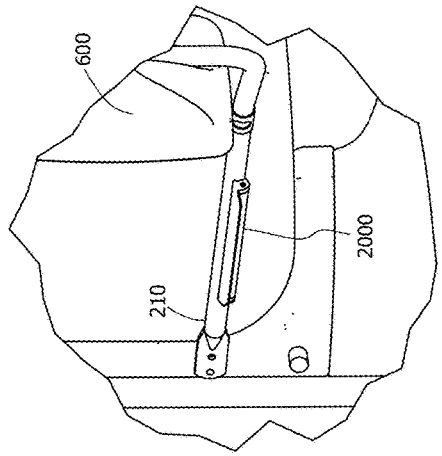
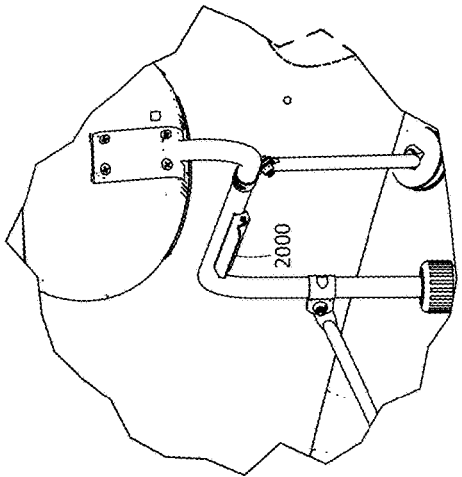

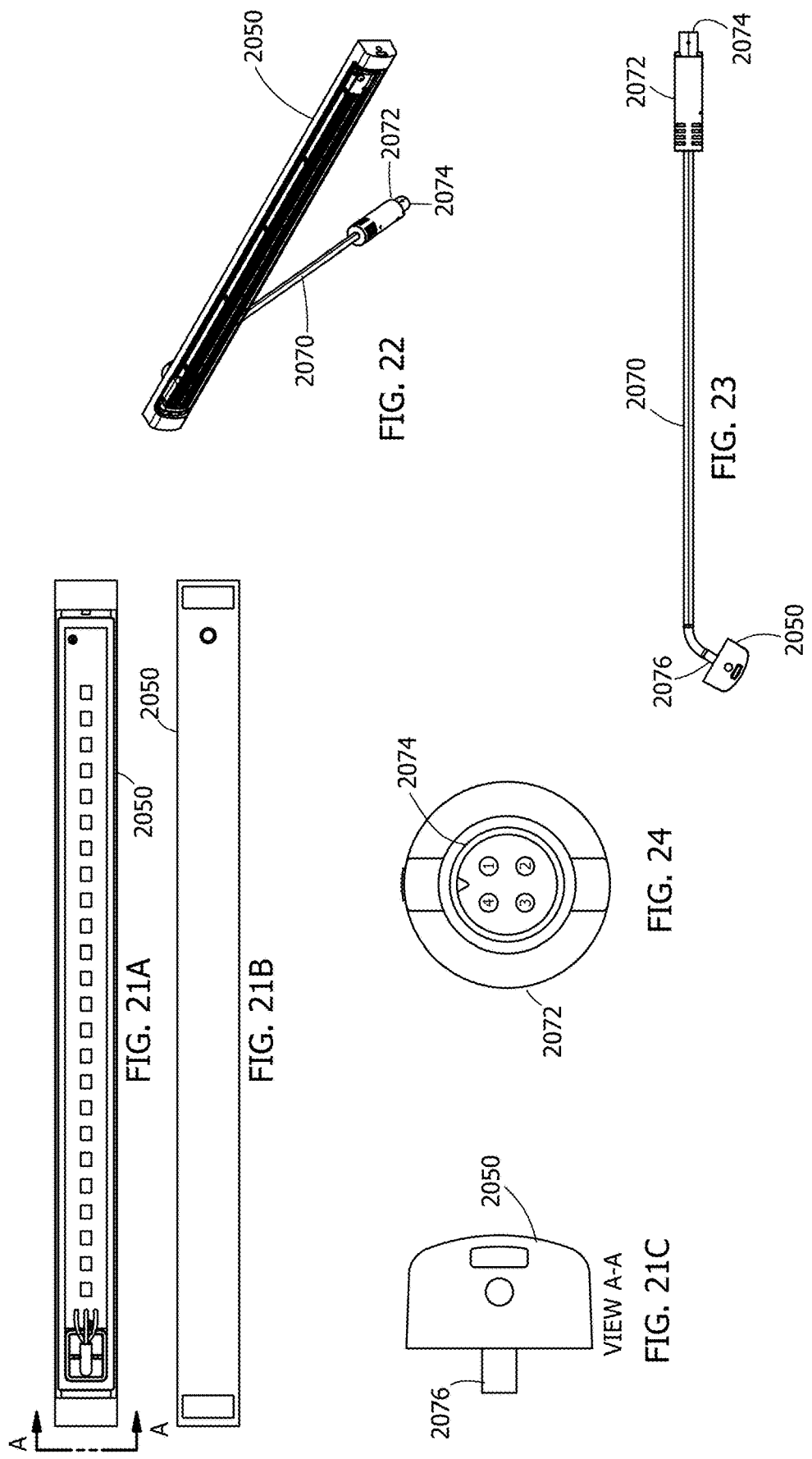

DOWNLIGHTING SIGNAL AND ILLUMINATION MIRROR HEAD FOR VEHICLE

INCORPORATION BY REFERENCE TO RELATED APPLICATIONS

This application is a continuation of U.S. patent application Ser. No. 17/649,437, filed Jan. 31, 2022, now U.S. Pat. No. 12,115,916, which claims priority to U.S. Provisional Application No. 63/144,396, filed Feb. 1, 2021. All of the above applications are hereby incorporated herein by reference in their entirety.

BACKGROUND

This disclosure generally relates to a downlighting/signal and illumination mirror head for vehicles. More specifically, the present disclosure relates to a variety of configurations of downlighting/signal and illumination mirror head for vehicles to provide illumination for passage loading area near the vehicle.

SUMMARY

Various embodiments for downlighting/signal and illumination mirror head for vehicle are provided. Vehicle mirror heads can play a vital role in vehicle operation. Such mirror heads can enable and/or provide visual inspections of surrounding areas for the vehicle operator or driver to properly or safely operate the vehicle. Vehicles, such as school buses and commercial vans, typically have increased sizes and require visual inspection of areas in front and to the side of the vehicle.

We have determined, therefore, that it would be highly advantageous to have a mirror head that provides additional illumination to the area under the mirror head to light the ground in order to make it easier for the vehicle operator to see pedestrians, for example students, crossing right in front of the vehicle or standing or walking along the right side of the vehicle. In additional we have determined that it would further be highly advantageous to have a side lighting provided on the right side of the vehicle that provides additional illumination to the area on the right side of the vehicle to light the ground in order to make it easier for the vehicle operator to see pedestrians, for example students, walking or standing along the right side of the vehicle. In addition, we have determined that it would be advantageous to provide a mirror head with one or more advantages in accordance with one or more of the structures and/or methods described herein.

Additional, alternative and/or optional features and advantages are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional. By use of the term "at least one of A and B" herein, it is intended to mean "one or more of X and Y."

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

BRIEF DESCRIPTION OF THE DRAWINGS

The foregoing summary, as well as the following detailed description of preferred embodiments of the assembly, will be better understood when read in conjunction with the appended drawings. For the purposes of illustrating certain aspects of the present invention, there are shown in the drawings preferred embodiments. It should be understood, however, that the assembly is not limited to the precise arrangement, structures, features, embodiments, aspects, and methods shown, and the arrangements, structures, features, embodiments, aspects and methods shown may be used singularly or in combination with other arrangements, structures, features, embodiments, aspects and methods. The drawings are not necessarily drawn to scale and are not in any way intended to limit the scope of the invention, but merely to clarify various exemplary embodiments of the invention.

FIG. 10 is an illustration of the side lighting device mounted on the right side of the vehicle according to some embodiments of the present inventions.

FIG. 11A is a perspective view of the side lighting device of FIG. 10. FIG. 11B is a front view of the side lighting device of FIG. 10. FIG. 11C is a top view of the side lighting device of FIG. 10. FIG. 11D is a side view of the side lighting device of FIG. 10. FIG. 11E is an exploded view of the side lighting device of FIG. 10.

FIG. 12A is another illustration of the lighting pod with the lamp and bushing not fully assembled. FIG. 12B is another illustration of the lighting pod with the lamp not fully assembled. FIG. 12C is another illustration of the lighting pod with the lamp fully assembled.

FIG. 13A is an illustration of the downlighting device with the lamp and bushing fully assembled. FIG. 13B is an illustration of the downlighting device with the lamp and bushing not fully assembled.

FIG. 14A is another illustration of the lighting pod with an alternative attachment mechanism to secure the downlighting device. FIG. 14B is another illustration of the lighting pod with an alternative attachment mechanism to secure the downlighting device with one of the downlighting devices separated from the rest of the pod.

FIG. 16 is an illustration of using of a LED light strip assembly mounted on different locations of a vehicle, such as a school bus, according to some embodiments of the present inventions.

FIG. 17A is an enlarged view of circle A of FIG. 16. FIG. 17B is an enlarged view of circle B of FIG. 16.

FIG. 18 is a front perspective view of the LED light strip assembly of FIG. 16.

FIG. 19 is a rear perspective view of the LED light strip assembly of FIG. 18.

FIG. 20 is an exploded view of the LED light strip assembly of FIG. 18.

FIG. 21A is a front view of a LED light strip of the LED light strip assembly, according to some embodiments of the present inventions. FIG. 21B is a rear view of the LED light strip. FIG. 21C is a side view of the LED light strip with a terminal part of an electrical connector attached.

FIG. 22 is a front perspective view of the LED light strip with the electrical connector attached.

FIG. 23 is a side view of the electrical connector of FIG. 22 with one end of the electrical connector attached to the LED light strip.

FIG. 24 is a side view of the electrical connector showing the connection pins.

DETAILED DESCRIPTION OF THE EMBODIMENTS

Figure 1:
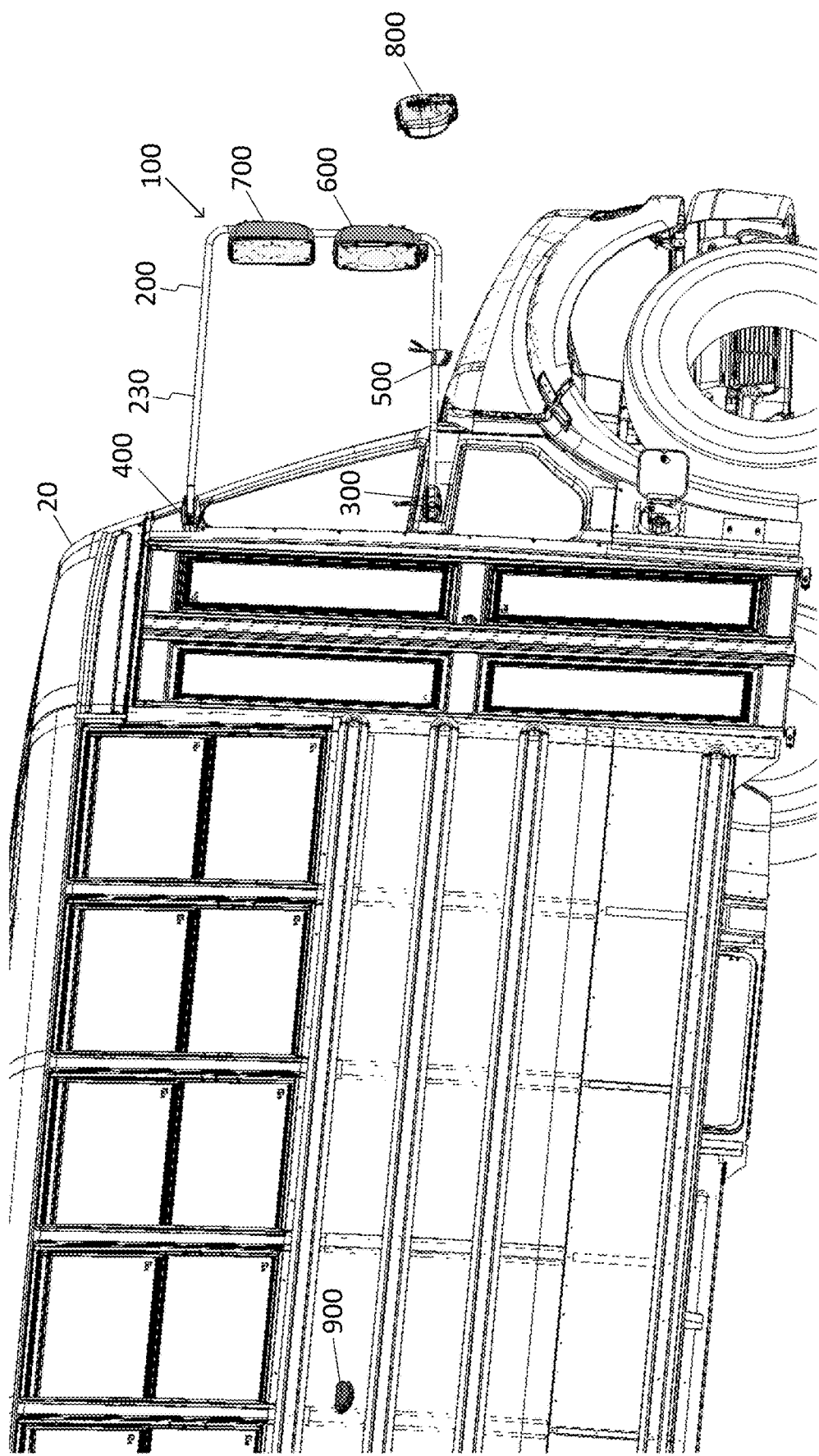
FIG. 1 is an illustration of the use of the present invention mounted on a vehicle, such as a school bus.

Before explaining at least one embodiment in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Referring now to FIG. 1, which is an illustration showing the use of the present invention when mounted on a vehicle, such as a school bus 20. A mirror assembly 100 is illustrated mounted on the vehicle 20 for providing extra illumination to the passenger loading area, for example, the area near or in front of the right front door of the vehicle 20, in addition to the typical mirror function for providing the vehicle driver the rear and/or side view of the vehicle. In some embodiments, the mirror assembly 100 comprises two clam shells 300, 400, and/or a lighting pod 500 and/or two mirror heads 600, 700 that are supported by a supporting arm (or mounting arm or tube or bracket) 200. In some embodiments, the mirror assembly 100 is mounted on the school bus 20 through the clam shells 300, 400.

A side lighting device 900 is mounted, for example, on the right side of the vehicle for providing extra illumination to the passenger loading area, for example, near or behind the right front door of the vehicle 20, according to some embodiments of the present inventions.

Although the mirror assembly 100 and side lighting device 900 are illustrated being mounted on a school bus 20, it should be understood that the present invention may be utilized with a wide variety of vehicles for a wide variety of applications. For example, the mirror assembly is well-suited for vehicles such as trucks and vans. Similarly, although the mirror assembly may be mounted in a variety of locations on a vehicle, one embodiment particularly suitable for school buses involves mounting the mirror assembly on the front corners of the vehicle fenders, as shown in FIG. 1.

It is also noted that the school bus 20 has rear view mirror assembly 100 in positions so that the driver can view the situation beside and behind the bus. Vehicle mirror assembly 100 in accordance with the present invention can be mounted on the front corners of the school bus 20 in order to provide the driver the fields of view that encompass both the front of the vehicle as well as the side of the vehicle. Mirrors of this type are often called cross-over or cross-view mirrors because they allow the driver to view children and other persons who may be walking across and in front of the bus.

Figure 2:
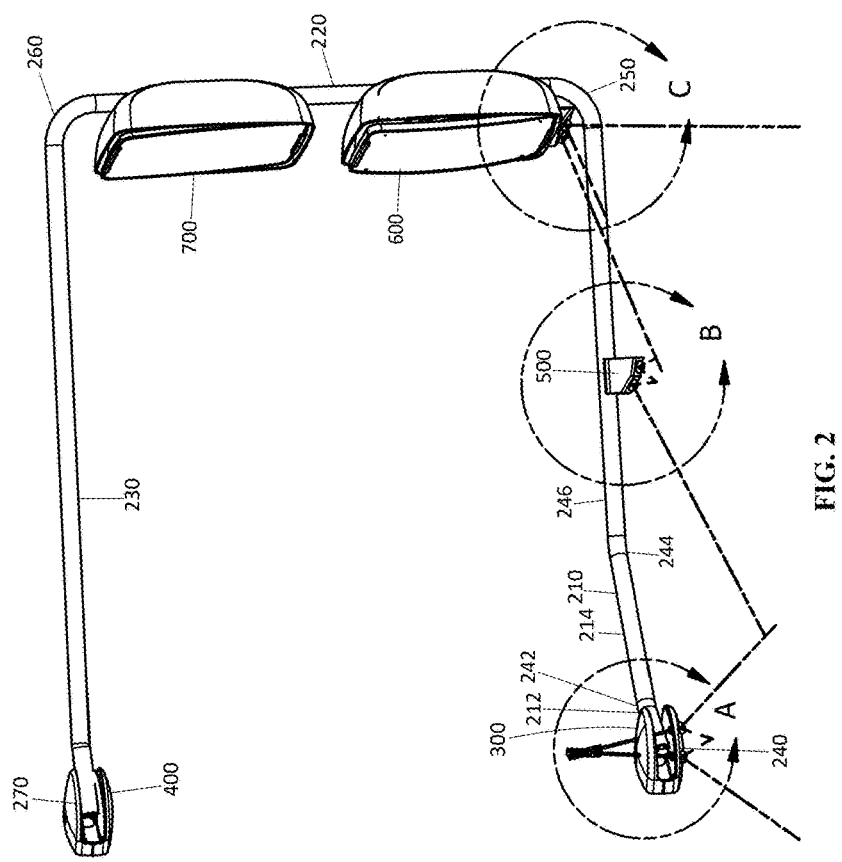
FIG. 2 is an illustration of a vehicle mirror assembly showing two clam shells, a lighting pod and two mirror heads mounted on a mirror supporting or mounting arm according to some embodiments of the present inventions.

Referring to FIG. 2, which is an illustration of an exemplary vehicle mirror assembly 100. In some embodiments, the mirror assembly 100 includes a lower clam shell 300, an upper clam shell 400, a lighting pod 500, a lower mirror head 600, an upper mirror head 700 and a supporting arm (or mounting arm or mounting bracket) 200.

A supporting arm 200 can have a generally horizontal lower arm 210, a generally vertical middle arm 220 and a generally horizontal upper arm 230, according to some embodiments of the present inventions. The lower arm 210, middle arm 220 and upper arm 230 can be continuously connected that the lower arm 210 and the middle arm 220 are connected at a first joining point 250 and the middle arm 220 and the upper arm 230 are connected at a second joining point 260. In this regard, the supporting arm 200 is generally a C-shaped structure with one end of the lower arm 210 can be the first end 240 of the supporting arm 200 and the other end of the lower arm 210 can be the first joining point 250, one end of the middle arm 220 can be the first joining point 250 and the other end of the middle arm 220 can be the second joining point 260, one end of the upper arm 230 can be the second joining point 260 and the other end of the upper arm 230 can be the second end 270 of the supporting arm 200. In other embodiments, curve, round or other shape structure can be used to form the supporting arm 200.

In some embodiments, a third joining point 242 is provided between the first end 240 and the first joining point 250. In some embodiments, a fourth joining point 244 is provided between the third joining point 242 and the first joining point 250. The third joining point 242 and the fourth joining point 244 can allow the lower arm 210 to change its shape other than a straight structure. For example, when installed with a vehicle, the first section 212 of the lower arm 210 can be aligned and substantially parallel to the fence of the vehicle while the second section 214 of the lower arm 210 can be gradually separated away from the fence of the vehicle and the third section 216 of the lower arm 210 can be further separated away from the fence of the vehicle.

The supporting arm 200 can be formed with a tubular or piping structure that electrical power and/or signal wires can be installed and running along the interior passageway or tunnel of the supporting arm 200. The electrical power and/or signal wires can be connected to electrical connectors of the vehicle through the first end 240 and/or the second end 270 of the supporting arm 200.

In some embodiments, the lower clam shell 300 can be mounted to the vehicle at a first mounting location and the upper clam shell 400 can be mounted to the vehicle at a second mounting location separated from the first mounting location. The first end 240 of the supporting arm 200 can be mounted to the lower clam shell 300 and the second end 270 of the supporting arm 200 can be mounted to the upper clam shell 400. In some embodiments, the lighting pod 500 is mounted to the supporting arm 200 preferably at the lower arm 210, preferably at the third section 246 of the lower arm 210. In some embodiments, the mirror heads 600, 700 are mounted to the supporting arm 200 preferably at the middle arm 220.

Figure 3C:
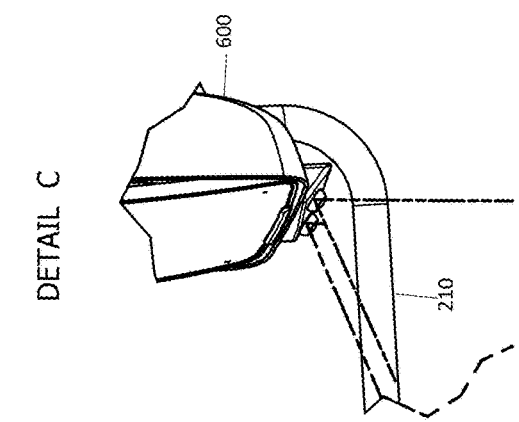
FIG. 3C is an enlarged view illustrating a portion of FIG. 2 to show details of the mirror head.
Figure 3A:
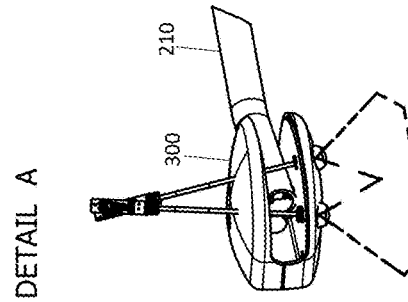
FIG. 3A is an enlarged view illustrating a portion of FIG. 2 to show details of the clam shell.
Figure 3B:
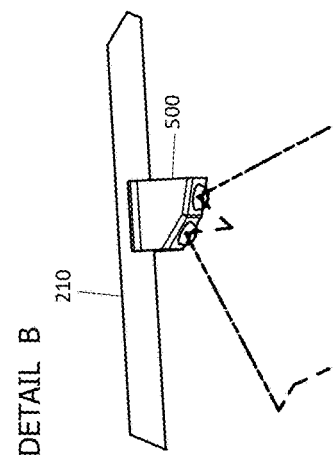
FIG. 3B is an enlarged view illustrating a portion of FIG. 2 to show details of the pod.

In some embodiments, the lower clam shell 300 is provided with one or more lighting devices at the bottom side (first downlighting configuration) for providing extra illumination to the passenger loading area, for example, the area near or in front of the right front door of the vehicle. FIG. 3A is an enlarged view illustrating a portion of FIG. 2 to show details of the clam shell 300. In some embodiments, the lighting pod 500 is provided with one or more lighting devices at the bottom side (second downlighting configuration) for providing extra illumination to the passenger loading area, for example, the area near or in front of the right front door of the vehicle. FIG. 3B is an enlarged view illustrating a portion of FIG. 2 to show details of the lighting pod 500. In some embodiments, the lower mirror head 600 is provided with one or more lighting devices at the bottom side (third downlighting configuration) for providing extra illumination to the passenger loading area, for example, the area near or in front of the right front door of the vehicle in addition to the typical mirror function of providing the vehicle driver the rear and/or side view of the vehicle. FIG. 3C is an enlarged view illustrating a portion of FIG. 2 to show details of a lower portion of the mirror head 600.

Figure 4:
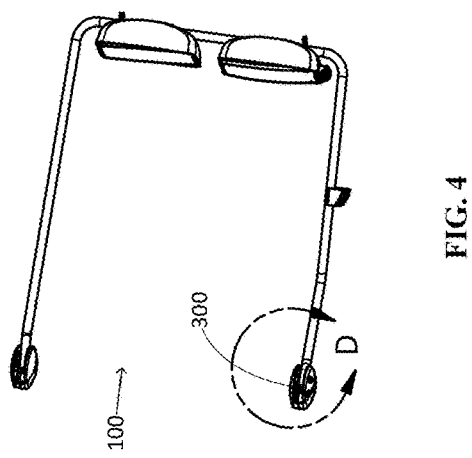
FIG. 4 is another illustration of the vehicle mirror assembly showing two clam shells, a lighting pod and two mirror heads mounted on a mirror supporting or mounting arm according to some embodiments of the present inventions.
Figure 5C:
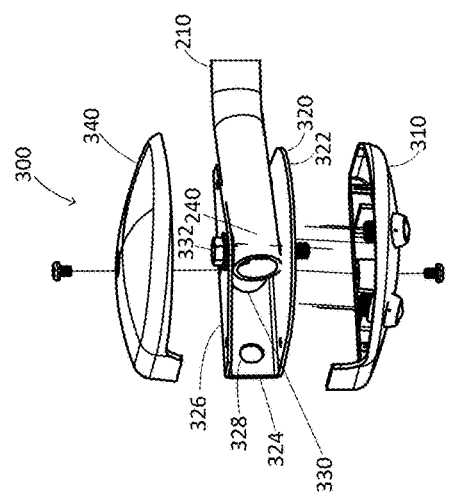
FIG. 5C is an exploded view of the clam shell of FIG. 5A.
Figure 5A:
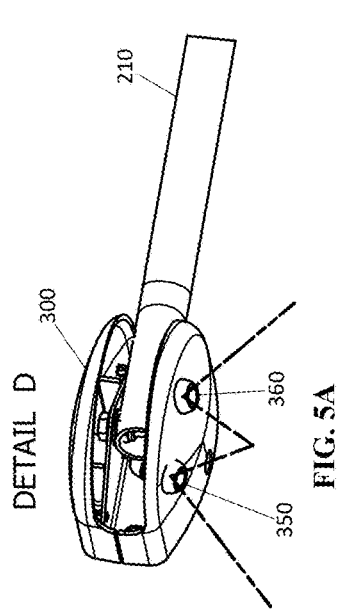
FIG. 5A is an enlarged view illustrating a portion of FIG. 4 to show details of the clam shell.
Figure 5B:
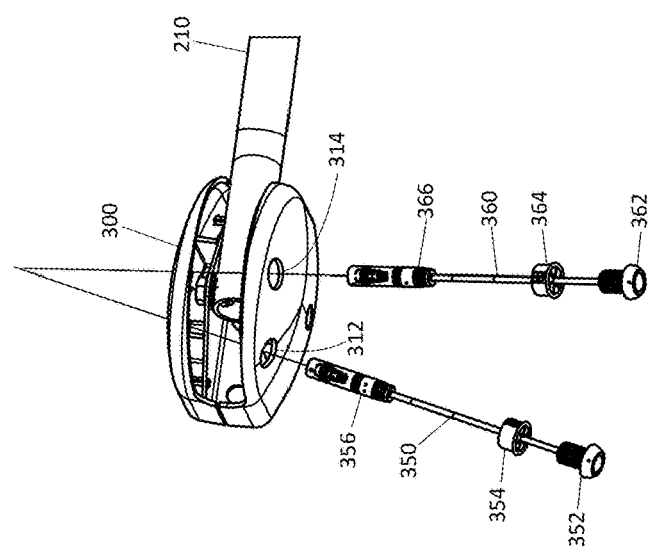
FIG. 5B is another enlarged view illustrating a portion of FIG. 4 to show details of the clam shell with two downlighting devices separated from the rest of the clam shell.

Referring also to FIG. 4, which is another illustration of the vehicle mirror assembly 100 showing the lower clam shell 300 and other elements. In addition, FIG. 5A is an enlarged view illustrating a portion of FIG. 4 to show details of the lower clam shell 300. FIG. 5B is another enlarged view illustrating a portion of FIG. 4 to show details of the clam shell 300 with two downlighting devices 350, 360 separated from the rest of the clam shell 300. FIG. 5C is an exploded view of the clam shell 300 of FIG. 5A.

In some embodiments, the clam shell 300 has a lower cover 310, an upper cover 340 and a middle piece 320 sandwiched between the lower cover 310 and the upper cover 340. The lower cover 310 can have holes 312, 314 for accepting the downlighting devices 350, 360, respectively.

The middle piece 320 can be in the form of a bracket having a generally horizontal bottom part 322, a generally vertical middle part 324 connected to the bottom part 322, and a generally horizontal upper part 326 connected to the middle part 324. In some embodiments, the middle part 324 has one or more holes 328 for mounting the clam shell 300 to the vehicle by, for example, screws. Other forms, for example, welding can also be used to attach the clam shell 300 to the vehicle. The first end 240 of the supporting arm 200 can be secured between the bottom part 322 and the upper part 326 by, for example, one or more screws 332.

Each of the downlighting devices 350, 360 can have a lamp 352, 362 that can be a threaded light-emitting diode (LED) for fitting into a bushing 354, 364 (or a nut), respectively. Each of the lamp 352, 362 is electrically connected by a wire 356, 366, respectively. Each of the wires 356, 366 can be fed through a hole 330 opened on the middle part 324 to be electrically connected with power/signal connectors or sources of the vehicle. In some embodiments, only a single downlighting device is provided instead of two downlighting devices 350, 360 as illustrated in FIGS. 5A-5C. In some embodiments, more than two downlighting devices are provided. When the mirror assembly 100 is in the first configuration to be equipped with the clam shell 300 having downlighting devices 350, 360, the mirror assembly 100 can cast light downward to further illuminate areas or ground near the vehicle, for example, a passage loading zone, to enable a driver to visually determine a presence of a person or object and/or to improve night time danger zone visibility.

In some embodiments, the upper clam shell 400 has similar configuration as that of the lower clam shell 300 except that the upper clam shell 400 does not have downlighting devices and the main function of the upper clam shell 400 is to anchor the mirror assembly 100 on the vehicle. In other embodiments, the upper clam shell 400 has the same configuration as that of the lower clam shell 300 and is able to cast light downward to further light the area near the passage loading zone in addition to the mounting function.

Figure 6:
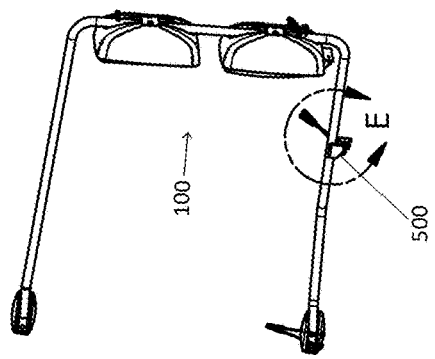
FIG. 6 is another illustration of the vehicle mirror assembly showing two clam shells, a lighting pod and two mirror heads mounted on a mirror supporting or mounting arm according to some embodiments of the present inventions.
Figure 7C:
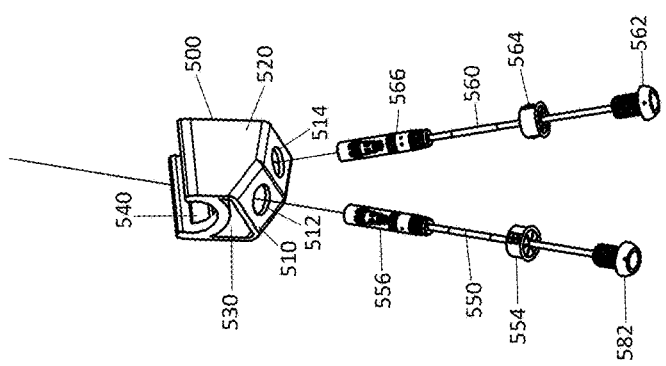
FIG. 7C is an exploded view of the lighting pod of FIG. 7A.
Figure 7A:
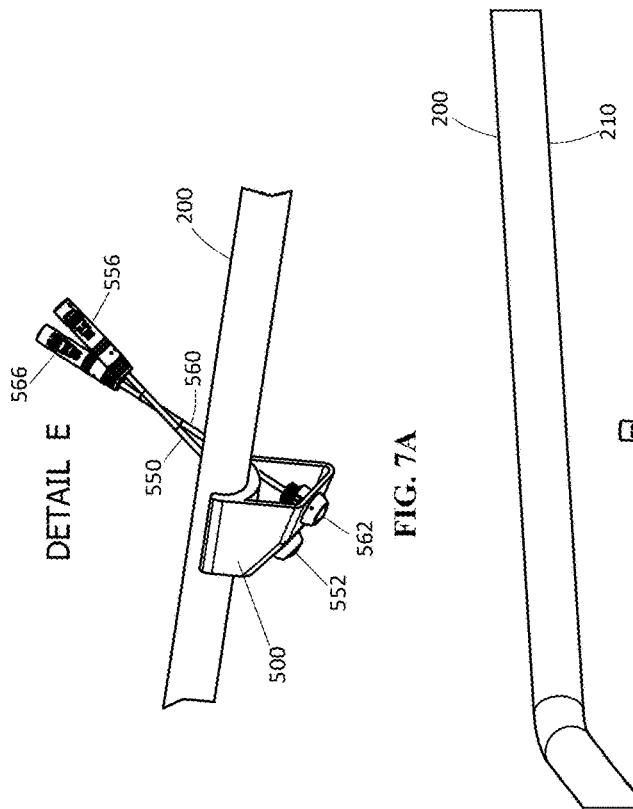
FIG. 7A is an enlarged view illustrating a portion of FIG. 6 to show details of the pod with the lighting pod been attached to the supporting arm.
Figure 7B:
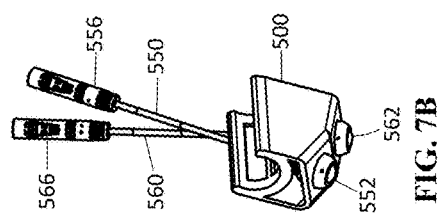
FIG. 7B is another enlarged view illustrating a portion of FIG. 6 to show details of the pod with the lighting pod been separated from the supporting arm.

Referring also to FIG. 6, which is another illustration of the vehicle mirror assembly 100 showing the lighting pod 500 and other elements. In addition, FIG. 7A is an enlarged view illustrating a portion of FIG. 6 to show details of the lighting pod 500 with the lighting pod 500 been attached to the lower arm 210 of the supporting arm 200. FIG. 7B is another enlarged view illustrating a portion of FIG. 6 to show details of the lighting pod with the lighting pod 500 been separated from the supporting arm 200. FIG. 7C is an exploded view of the lighting pod 500 of FIG. 7A.

In some embodiments, the lighting pod 500 has a bottom surface 510, a front surface 520 adjacent to the bottom surface 510, a rear surface 530 adjacent to the bottom surface 510 and opposite to the front surface 520, and a top surface 540. The bottom surface 510 can have holes 512, 514 for accepting the downlighting devices 550, 560, respectively.

The top surface 540 has a groove sized to accept the lower arm 210 of the supporting arm 200. In some embodiments, the groove on the top surface 540 can snap on the lower arm 210 and the lighting pod 500 can hold the lower arm 210 by friction. In other embodiments, the lighting pod 500 can attached to the lower arm 210 by, for example, a pipe clip, a bolt clamp, a socket, etc.

Each of the downlighting devices 550, 560 can have a lamp 552, 562 that can be threaded LED for fitting into a bushing 554, 564 (or a nut), respectively. Each of the lamp 552, 562 is electrically connected by a wire 556, 566, respectively. Each of the wires 556, 566 can be fed through a hole opened on the lower arm 210 of the supporting arm 200 and runs along the interior passageway of the supporting arm 200 and reaches to the hole 330 of the lower clam shell 300 to be electrically connected with power/signal connectors or sources of the vehicle. In some embodiments, only a single downlighting device is provided instead of two downlighting devices 550, 560 as illustrated in FIGS. 7A-7C. In some embodiments, more than two downlighting devices are provided. When the mirror assembly 100 is in the second configuration to be equipped with the lighting pod 500 having downlighting devices 550, 560, the mirror assembly 100 can cast light downward to further illuminate areas or ground near the vehicle, for example, a passage loading zone, to enable a driver to visually determine a presence of a person or object and/or to improve night time danger zone visibility.

Figure 8:
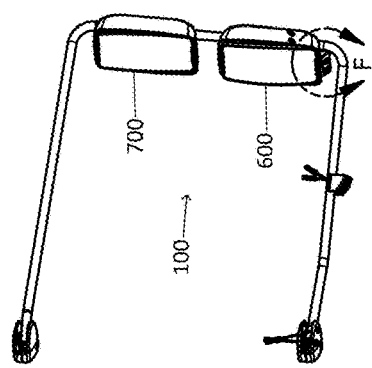
FIG. 8 is another illustration of the vehicle mirror assembly showing two clam shells, a lighting pod and two mirror heads mounted on a mirror supporting or mounting arm according to some embodiments of the present inventions.
Figure 9B:
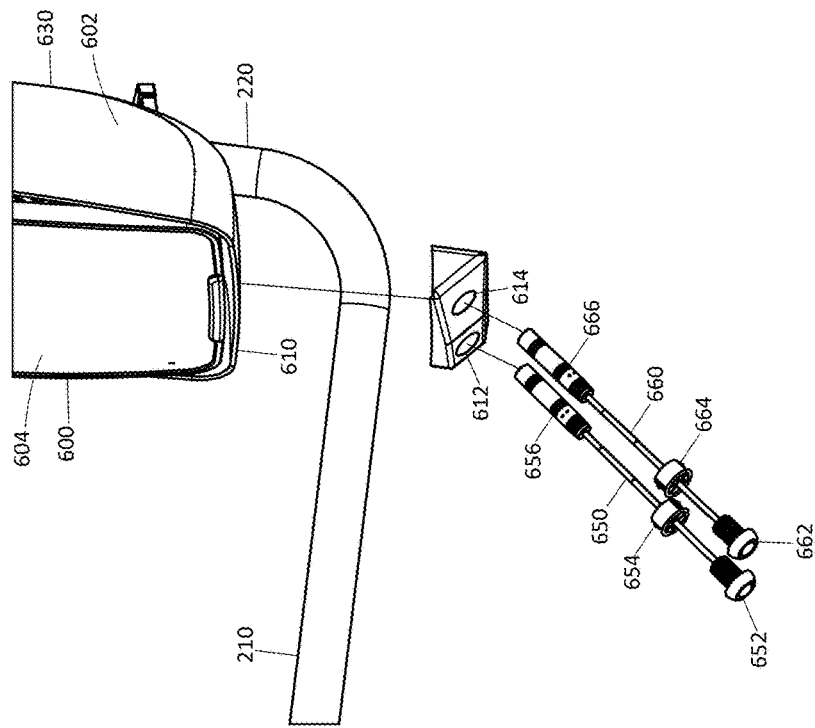
FIG. 9B is another enlarged view illustrating a portion of FIG. 8 with the bottom piece of the mirror head and the downlighting devices been separated from the rest of the mirror head to show details of the mirror head.
Figure 9A:
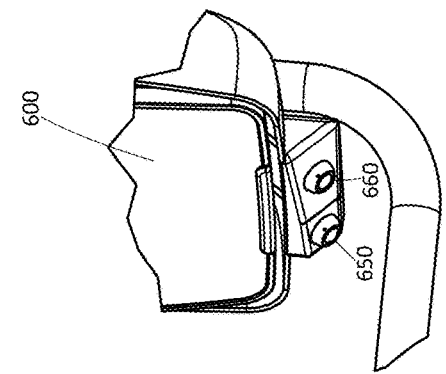
FIG. 9A is an enlarged view illustrating a portion of FIG. 8 to show details of the mirror head.

Referring also to FIG. 8, which is another illustration of the vehicle mirror assembly showing the mirror heads 600, 700 and other elements. In addition, FIG. 9A is an enlarged view illustrating a portion of FIG. 8 to show details of the mirror head 600. FIG. 9B is another enlarged view illustrating a portion of FIG. 8 with the bottom piece 610 of the mirror head 600 and the downlighting devices 650, 660 been separated from the rest of the mirror head to show details of the mirror head.

The mirror head 600 mainly includes a mirror housing 602 and a mirror lens 604. The mirror lens has a perimeter that is sized to fit and secured within the mirror housing by, for example, screws or other connectors. The mirror housing includes a bottom piece 610, an opposing top side and a rear facing side 630.

The rear facing side 630 of the mirror head 600 has a groove sized to accept the middle arm 220 of the supporting arm 200. In some embodiments, the groove on the rear facing side 630 of the mirror head 600 can snap on the middle arm 220 and the mirror head 600 can hold the middle arm 220 by friction. In other embodiments, the mirror head 600 can attached to the middle arm 220 by, for example, a pipe clip, a bolt clamp, a socket, etc. In some embodiments, a tubular mirror mounting arm (not shown) can be provided for mounting the mirror head 600. The mirror mounting arm can be attached to the middle arm 220. The tubular mirror mounting arm 220 can be provided with a straight cut end for a tunnel type mounting. Alternatively, the tubular mirror mounting arm 220 can be provided with a coined end with mounting hole for a ball stud type mounting.

Each of the downlighting devices 650, 660 can have a lamp 652, 662 that can be threaded LED for fitting into a bushing 654, 664 (or a nut), respectively. Each of the lamp 652, 662 is electrically connected by a wire 656, 666, respectively. Each of the wires 656, 666 can be fed through a hole opened on the middle arm 220 of the supporting arm 200 and runs along the interior of the middle arm 220 and lower arm 210 and reaches to the hole 330 of the lower clam shell 300 to be electrically connected with power/signal connectors or sources of the vehicle. In some embodiments, only a single downlighting device is provided instead of two downlighting devices 650, 660 as illustrated in FIGS. 9A-9B. In some embodiments, more than two downlighting devices are provided. When the mirror assembly 100 is in the third configuration to be equipped with the mirror head 600 having downlighting devices 650, 660, the mirror assembly 100 can cast light downward to further illuminate areas or ground near the vehicle, for example, a passage loading zone, to enable a driver to visually determine a presence of a person or object and/or to improve night time danger zone visibility.

In some embodiments, the upper mirror head 700 has similar configuration as that of the lower mirror head 600 except that the upper mirror head 700 does not have downlighting devices and the main function of the upper mirror head 700 is to provide rear/side view to the vehicle driver. In other embodiments, the upper mirror head 700 has the same configuration as that of the lower mirror head 600 and is able to cast light downward to further light the area near the passage loading zone in addition to the mirror function.

Three downlighting configurations (300, 500, 600) for casting light downward to further light the area near the passage loading zone near a vehicle have been disclosed. In some embodiments, only one of the three downlighting configurations is used in the mirror assembly 100. For example, only the clam shell 300 is used for downlighting, a lighting pod is not installed and the mirror head 600 is not equipped with downlighting devices and is used solely for mirror function. As another example, only the lighting pod 500 is used for downlighting, the clam shell is used solely for mounting the mirror assembly 100 and the mirror head is not equipped with downlighting devices and is used solely for mirror function. As yet another example, only the mirror head 600 is used for downlighting, the clam shell is used solely for mounting the mirror assembly 100 and is not equipped with downlighting devices and a lighting pod is not installed.

In some embodiments, two of the three downlighting configurations are used in the mirror assembly 100. For example, the clam shell 300 and the lighting pod 500 are used for downlighting, the mirror head is not equipped with downlighting devices and is used solely for mirror function. As another example, the clam shell 300 and the mirror head 600 are used for downlighting, then a lighting pod is not installed. As yet another example, the lighting pod 500 and the mirror head 600 are used for downlighting, the clam shell is used solely for mounting the mirror assembly 100 and is not equipped with downlighting devices.

In some embodiments, all three downlighting configurations are used in the mirror assembly 100, the clam shell 300, the lighting pod 500 and the mirror head 600 are all used for downlighting. In addition, the clam shell 300 is used also for mounting the mirror assembly 100 and the mirror head 600 is also used for mirror function.

In some embodiments, one or more downlighting configurations (300, 500, 600) are activated only when the vehicle is stopped (e.g., a pre-condition to activate the lights to prevent unnecessary use of the lights when the vehicle is in operation). In some embodiments, one or more downlighting configurations (300, 500, 600) are activated when the vehicle is stopped, slowing, speeding up and/or turning, and/or once the vehicle is stopped and the additional activation of one or more of opening of the door, side strip lighting, red flashers, vehicle gears placed in park. In other embodiments, the downlighting configurations are turned on when the vehicle is stopped and/or when the vehicle gears are placed into park In some embodiments, one or more downlighting configurations (300, 500, 600) are triggered responsive to one or more of detection of objects or pedestrians, when the vehicle is slowing or speeding up, when the vehicle is stopped, when the vehicle is turning, when the detection sensitivity as described below in connection with pedestrian or object detection.

In some embodiments, one or more downlighting configurations (300, 500, 600) can be used in combination with a collision avoidance and/or detection system to provide audible/visual alerts to the drivers and/or the pedestrian.

Figure 11G:
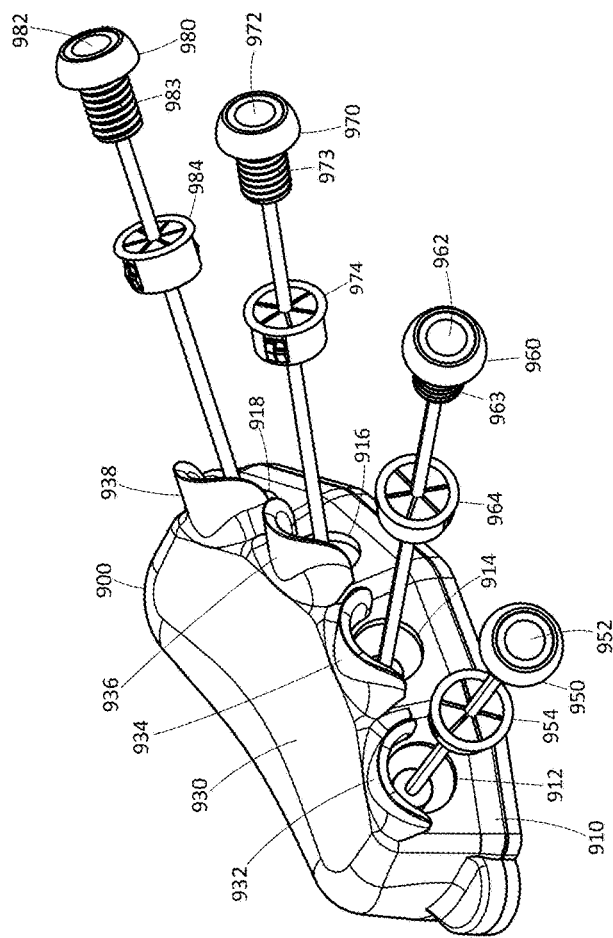
FIG. 11G is another exploded view of the side lighting device of FIG. 10.
Figure 11F:
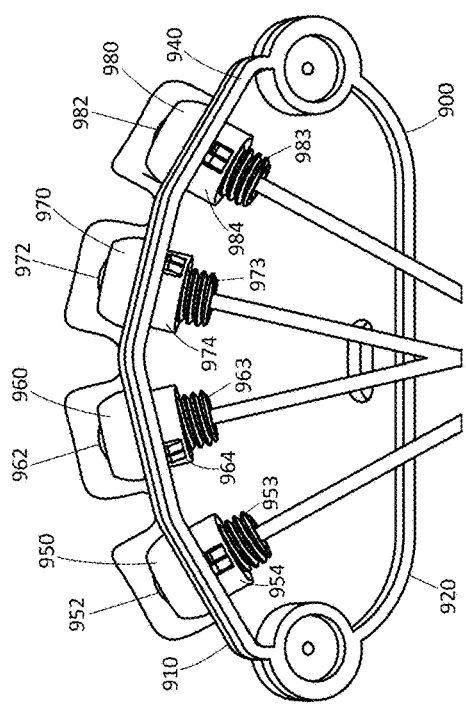
FIG. 11F is a bottom view of the side lighting device of FIG. 10.

Referring also to FIG. 10, which is an illustration of the side lighting device 900 mounted on the right side of the vehicle 20 according to some embodiments of the present inventions. In addition, FIG. 11A is a perspective view of the side lighting device 900 of FIG. 10. FIG. 11B is a front view of the side lighting device 900 of FIG. 10. FIG. 11C is a top view of the side lighting device 900 of FIG. 10. FIG. 11D is a side view of the side lighting device 900 of FIG. 10. FIG. 11E is an exploded view of the side lighting device 900 of FIG. 10. FIG. 11F is a bottom view of the side lighting device 900 of FIG. 10. FIG. 11G is another exploded view of the side lighting device 900 of FIG. 10.

In some embodiments, the side lighting device 900 has a bottom side 910, a top side 920, a front side 930 between the bottom side 910 and the top side 920 and a rear side (mounting side) 940 opposing to the front side 930. The side lighting device 900 can have holes 912, 914, 916, 918 on the bottom side 910 for accepting the downlighting devices 950, 960, 970, 980, respectively. The mounting side 940 can have one or more holes for mounting the side lighting device 900 to the vehicle by, for example, screws. Other forms, for example, welding can also be used to attach the side lighting device 900 to the vehicle.

Each of the downlighting devices 950, 960, 970, 980 can have a lamp 952, 962, 972, 982 that can be threaded LED for fitting into a bushing 954, 964, 974, 984 (or alternatively, a nut), respectively. Each of the downlighting devices 950, 960, 970, 980 can have a thread 953, 963, 973, 983 that can be used to secure the threaded LEDs (or lamps) 952, 962, 972, 982 into bushings 954, 964, 974, 984, respectively. Other forms of connection can optionally be used, such as snap fit, adhesive, friction fit, and the like.

Figure 15:
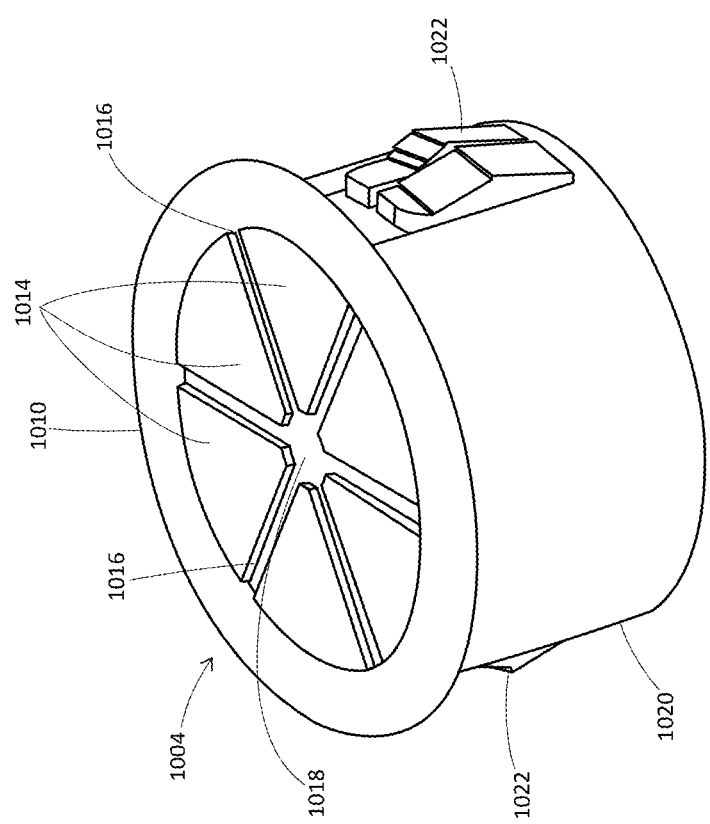
FIG. 15 is a perspective view of a bushing according to some embodiments of the present inventions.

Referring also to FIG. 15, which is a perspective view of a bushing 1004 according to some embodiments of the present inventions. The bushing 1004 has a pie-shaped top side 1010 with an outer ring 1020. In some embodiments, the pie-shaped top side 1010 has more than one sectors (pedals or flaps) 1014, each with its arc (curved edge) connected to the outer ring 1012 and two radii (straight edges) separated from adjacent pedals by gaps 1016. The center of the top side 1010 has a hole 1018. The bushing 1004 also has a cylindrical side wall 1020 with its top ring connected to the top side 1010. The side wall 1020 has one or more snap fingers 1022 configured to secure the bushing 1004 into a housing. The bushing 1004 illustrated in FIG. 15 and described herein can be applied to the bushings 354, 364, 554, 564, 654, 664, 954, 964, 974, 984.

For assembly of the side lighting device 900, in some embodiments, each of the threads 953, 963, 973, 983 can be inserted into a center hole of the bushing 954, 964, 974, 984, respectively, with a ratcheting action with the pedals (snap bushings). In this configuration, the threads can be inserted into the bushings with a smaller force than that of pulling the threads out from the bushings. In other words, it is easier to insert the threads into the bushings, yet it is harder to pull the threads out from the bushings. Another advantage of using the snap bushing is to allow a quick and secure installation of the LED into the bushing without the use of conventional mounting methods (e.g., nuts, screws, adhesive, etc.).

Alternatively, each of the threads 953, 963, 973, 983 can also serve the purpose of allowing a nut (referring also to 574, 584 in FIGS. 14A-14B) to be used to secure the LED in situations where the snap bushing cannot work. For example, the snap bushing can only be mounted within a certain range of material thickness. If the thickness of mounting material is beyound the range, then a nut, for example, 7/16-18, can be used to secure the LED.

Once the threads 953, 963, 973, 983 of the downlighting devices 950, 960, 970, 980 are inserted into the bushing, 954, 964, 974, 984, respectively, each of the whole assembly (threaded LED, thread, bushing) can be snapped into a hole or housing 912, 914, 916, 918, respectively, with the snap fingers 1022 (see FIG. 15) on the side wall of the bushing. In this configuration, the whole assembly can be inserted into the holes with a smaller force than that of pulling the whole assembly out from the holes. In other words, it is easier to insert the whole assembly into the holes yet it is harder to pull the whole assembly out from the hole.

Each of the lamp 952, 962, 972, 982 can be electrically connected by a wire 956, 966, 976, 986 respectively. Each of the wires 956, 966, 976, 986 can be fed through a hole opened on the mounting side to be electrically connected with power/signal connectors or sources of the vehicle. In some embodiments, less than three downlighting devices are provided instead of four downlighting devices 950, 960, 970, 980 as illustrated in FIGS. 11A-11G. In some embodiments, more than four downlighting devices can be provided. The side lighting device 900 having downlighting devices 950, 960, 970, 980 can cast light downward to further illuminate areas or ground near the vehicle, for example, a passage loading zone, to enable a driver to visually determine a presence of a person or object and/or to improve night time danger zone visibility.

In some embodiments, the side lighting device 900 is provided with visors 932, 934, 936, 938 for screening the emitted lights from the downlighting devices 950, 960, 970, 980, respectively, from emitting in a horizontally direction from the front side 930. In this regard, the emitted lights from the downlighting devices 950, 960, 970, 980 are preferably to go downward from the bottom side 910.

In some embodiments, the side lighting device 900 is provided with ultraviolet (UV) lights to enhance visibility of subjects in low light, where a visible light beam is insufficient. Such UV lights can have certain wavelengths, for example, from 10 nm to 400 nm, that may enhance low-light visibility of certain colors. In some embodiments, the UV lights are UV LEDs.

The Eyemax LED mirror head 800 can be installed with snap bushings as discussed herein in connection with FIGS. 11A-11G and 15.

In this regard, the mirror assembly 100 is provided with three different configurations (300, 500, 600) of downlighting for the passenger loading area along with the side lighting 900 and the Eyemax LED 800. Altogether, according to some embodiments of the present inventions, a complete system for providing extra illumination to the passenger loading area can be made up of one or more of the three downlighting configurations (300, 500, 600), the side lighting 900 and the Eyemax LED 800.

FIG. 12A is another illustration of the lighting pod 500 with the lamp 552 and bushing 554 not been fully assembled. FIG. 12B is another illustration of the lighting pod 500 with the lamp 552 not been fully assembled. As shown, the thread lamp 562 can bushing into the hole 512 of the lighting pod for quick assembly process. FIG. 12C is another illustration of the lighting pod 500 with the lamps been fully assembled.

FIG. 13A is an illustration of the downlighting device with the lamp and bushing been fully assembled. FIG. 13B is an illustration of the downlighting device with the lamp and bushing not been fully assembled.

FIG. 14A is another illustration of the lighting pod 500 with an alternative attachment mechanism to secure the downlighting devices 570, 580. FIG. 14B is another illustration of the lighting pod 500 with an alternative attachment mechanism to secure the downlighting device with one of the downlighting devices 570, 580 separated from the rest of the pod. As shown, each of the threaded lamps 572, 582 is secured to the lighting pod 500 by a nut 574, 584, respectively. In this regard, two configurations (bushing and nut) for holding the downlighting device are disclosed. Examples of the first configuration is shown in FIGS. 12A-12C and examples of the second configuration is shown in FIGS. 14A-14B. Although a lighting pod is used as example to illustrate two configurations for holding the downlighting device, it is understandable that the two configurations for holding the downlighting device is applicable to the clam shell 300, the mirror head 600, and the side lighting 900 as well.

Referring to FIGS. 16-24, in some embodiments, a LED light strip assembly 2000 can be used as an alternative to, or in combination with, the lighting pod 500 shown in FIGS. 1, 2 and 6. As illustrated in FIG. 16, the LED light strip assembly 2000 can be mounted to a supporting arm, for example, at the lower arm 210 of a rearview mirror arm, as shown in FIG. 16 and FIG. 17A, which is an enlarged illustration of circle A of FIG. 16, for providing extra illumination to the passenger loading area, for example, the area near the right front door of the vehicle 20. The LED light strip assembly 2000 can also be mounted near the front side of the vehicle 20, for example, to a supporting arm of a cross view mirror as shown in FIG. 16 and FIG. 17B, which is an enlarged illustration of circle B of FIG. 16, to provide extra illumination to the passenger loading area, for example, the area near or in front of the right front door of the vehicle 20. Other locations on the vehicle can alternatively be used for mounting LED light strip assembly 2000.

In some embodiments, the LED light strip assembly 2000 comprises a LED light strip 2050 and a mounting base 2010. The LED light strip 2050 can have a plurality of LED lights aligned in one or more rows.

In some embodiments, the mounting base 2010 can have a top side 2012, a front facing side 2014, a rear facing side 2016, a right side and a left side. Each of the right side and the left side can have a screw hole for securing the LED light strip 2050 to the front facing side 2014 of the mounting base 2010 with screws 2032, 2034, respectively.

The mounting base 2010 can have integrated shroud. In some embodiments, two or more tube mount wedges 2024, 2026 can be provided on the rear facing side 2016 of the mounting base 2010 for providing mating interface between the mounting base 2010 and a tubular surface, for example, a mirror supporting arm 200. Each of the tube mount wedges 2024, 2026 can have a flat side for attaching to the rear facing side 2016 of the mounting base 2010, and a curved or concave side, opposing to the flat side, for receiving the supporting arm 200 and to secure the LED light strip assembly 2000 to the supporting arm 200. Other configurations can optionally be used.

An electrical connector 2070, for example, a pigtail, harness or other type of harness, can be provided for connecting the LED light strip 2050 with electrical connectors of the vehicle 20 along the interior passageway or tunnel of the supporting arm 200. The electrical connector 2070 has a terminal 2076 at one end of the pigtail harness 2070 for connecting to the LED light strip 2050. The electrical connector 2070 has connecting pins 2076 at the other end for connecting to electrical connectors of the vehicle. A hole 2030 opened through the front facing side 2014 of the mounting base 2010 can be provided to facilitate the connecting and/or running of the electrical connector 2070 to a power source. Once assembled, the electrical connector 2070 is not visible from the exterior of the LED light strip assembly 2000. Other locations on the vehicle can alternatively be used for mounting LED light strip assembly 2000 and/or LED light strip 2050 and/or other light strip or other lighting device.

Figure 25:
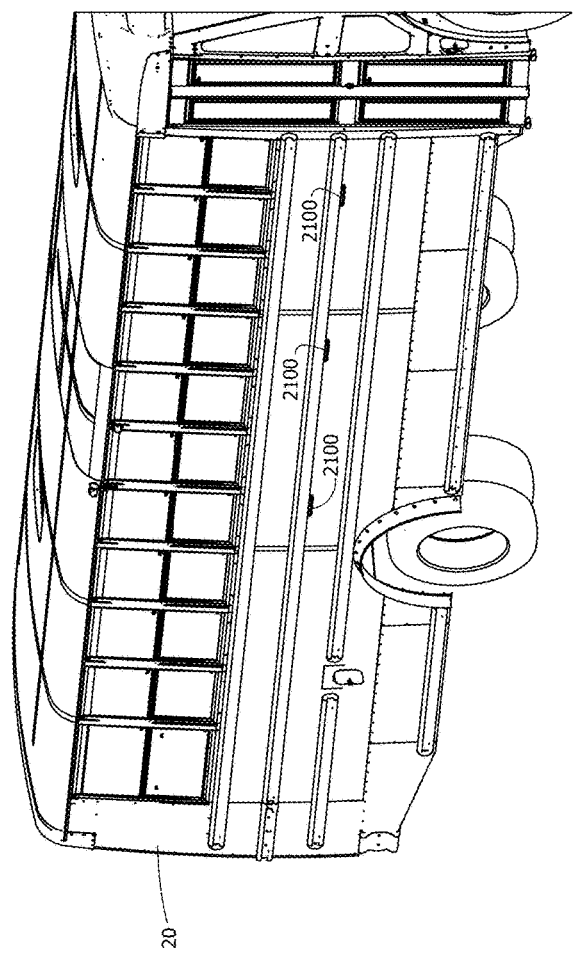
FIG. 25 is an illustration of the use of yet another LED light strip assembly mounted on different locations of a vehicle, such as a school bus, according to some embodiments of the present inventions.
Figure 26:
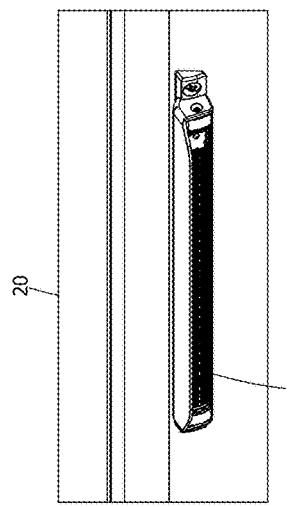
FIG. 26 is an enlarged view of a portion of FIG. 25 to show the LED light strip assembly.
Figure 28:
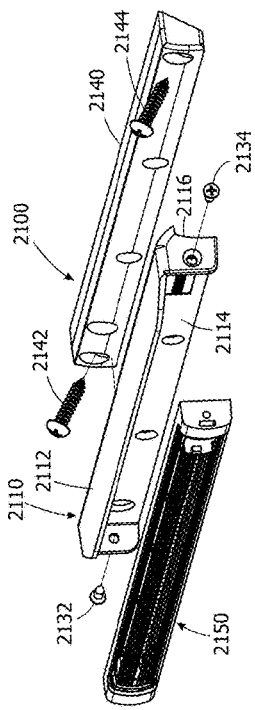
FIG. 28 is an exploded view of the LED light strip assembly of FIG. 27.
Figure 27:
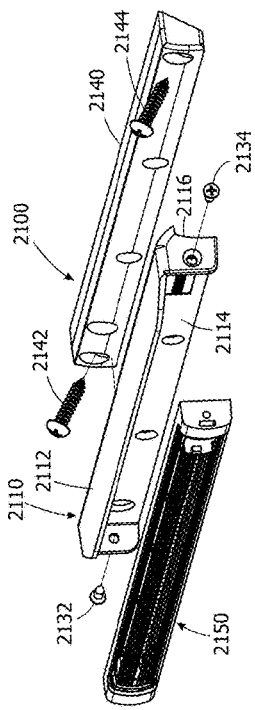
FIG. 27 is a front perspective view of the LED light strip assembly of FIG. 25.

Referring to FIGS. 25-27, in some embodiments, one or more LED light strip assemblies 2100 can be used as an alternative to, or in combination with, the LED light strip assembly 2000, and mounted to the side panel or body of the vehicle 20 as shown in FIG. 25 and FIG. 26, for providing extra illumination to the passenger loading area, for example, the area near or behind the right front door of the vehicle 20.

In some embodiments, the LED light strip assembly 2100 comprises a LED light strip 2150 and a mounting base 2110. The LED light strip 2150 can have a plurality of LED lights aligned in one or more rows. In some embodiments, the LED light strip 2150 can be the same or is compatible to the LED light strip 2050 described in connection to FIGS. 16-24.

In some embodiments, the mounting base 2110 has a top side 2112, a front facing side 2114, a rear facing side 2116, a right side and a left side. Each of the right side and the left side can have a screw hole for securing the LED light strip 2150 to the front facing side 2114 of the mounting base 2110 with screws 2132, 2134, respectively.

Figure 29:
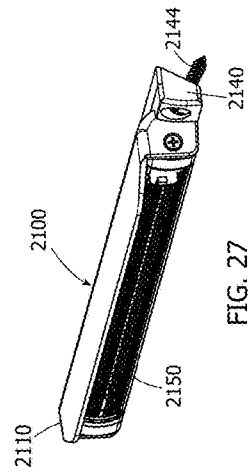
FIG. 29 is a partial side view of the LED light strip assembly of FIG. 27 showing a bias angle between the front face of the LED light strip and the mounting surface of the vehicle.

The mounting base 2110 can have integrated shroud. In some embodiments, an angled body mount wedge 2140 can be provided for connecting the rear facing side 2116 of the mounting base 2110 to the panel or body of the vehicle 20 with a bias angle. The body mount wedge 2140 can have a flat front side for attaching to the rear facing side 2116 of the mounting base 2110, a flat rear side for mounting to the side panel or body of a vehicle, a top side, a bottom side, a left side, and a right side. In some embodiments, the area of the top side is greater than the area of the bottom side while the area of the front side and rear side are substantially the same size that, when assembled, a bias angle (see FIG. 29) can be formed between the front side of the LED light strip 2150 and the rear side of the body mount wedge 2140. The angled body mount wedge 2140 and the mounting base 2110 can be connected by, for example, rivets or other standard fasten or attachment devices, such as screws, bolts, adhesive and the like. Screws 2142, 2144, or other standard fasten or attachment devices, can be provided to secure the LED light strip assemblies 2100 to the vehicle 20, and optionally to be mounted flush to the side panel or other location of the vehicle. When assembled, the angled body mount wedge 2140 is configured to provide a bias angle between the front surface of the LED light strip 2150 and the body panel of the vehicle 20 and allow the LED light strip 2150 to be biased, for example, downwards to enhance ground coverage. In addition, such biased downward lighting from the LED light strip 2150 can prevent direct eye contact with pedestrians. In some embodiments, the body mount wedge is not angled or angled to direct the light in a predetermined direction other than the downward direction.

A standard electrical connector (not shown) can be provided for connecting the LED light strip 2150 with electrical connectors of the vehicle.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, the specific sequence of the above described process may be altered so that certain processes are conducted in parallel or independent, with other processes, to the extent that the processes are not dependent upon each other. Thus, the specific order of steps described herein is not to be considered implying a specific sequence of steps to perform the above described process. Other alterations or modifications of the above processes are also contemplated. For example, further insubstantial approximations of the above equations are also considered within the scope of the processes described herein.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mirror assembly for a vehicle, comprising:
   a clam shell including one or more first downlighting devices to illuminate areas or ground near the vehicle to enable a driver to visually determine a presence of a person or object;
   a supporting arm mounted to the clam shell;
   a mirror head configured to be mountable to the supporting arm; and
   a lighting pod mounted to the supporting arm and having one or more second downlighting devices.

2. The mirror assembly for a vehicle according to claim 1, wherein the supporting arm has an internal passage way for running an electrical wire, and wherein the one or more second downlighting devices are wired to an electrical connector of the vehicle through the internal passage way of the supporting arm.

3. The mirror assembly for a vehicle according to claim 2, wherein the mirror head has one or more third downlighting devices.

4. The mirror assembly for a vehicle according to claim 3, wherein the one or more third downlighting devices are wired to the electrical connector of the vehicle through the internal passage way of the supporting arm.

5. The mirror assembly for a vehicle according to claim 1, wherein the mirror head has one or more second downlighting devices.

6. The mirror assembly for a vehicle according to claim 5, wherein the supporting arm has an internal passage way for running an electrical wire, and wherein the one or more second downlighting devices are wired to electrical connectors of the vehicle through the internal passage way of the supporting arm.

7. The mirror assembly for a vehicle according to claim 6, wherein each of the first downlighting devices, second downlighting devices, third downlighting devices are activated independent of the presence of the person or object.

8. The mirror assembly for a vehicle according to claim 6, wherein each of the first downlighting devices, second downlighting devices, third downlighting devices are activated responsive to at least one vehicle operation or operating characteristic prior to detection of the presence of the person or object.

9. The mirror assembly for a vehicle according to claim 6, further comprising an activation device configured to activate the first downlighting devices, second downlighting devices, third downlighting devices to provide light signals responsive to one or more activation or triggering signals.

10. The mirror assembly for a vehicle according to claim 9, wherein one of the one or more activation or triggering signals comprises one or more of a backup signal, a stop-completed signal, an opening of a door signal, hazard light activation signal, vehicle gear in park signal or exterior side strip signal.

11. The mirror assembly for a vehicle according to claim 6, further comprising an activation device configured to activate the first downlighting devices, second downlighting devices, third downlighting devices to provide light signals responsive to one or more activation or triggering signals after a predetermined vehicle operation or vehicle operating characteristic.

12. The mirror assembly for a vehicle according to claim 11, wherein the predetermined vehicle operation or vehicle operating characteristic comprises the vehicle in a stopped state or the vehicle parking gear in park.

13. The mirror assembly for a vehicle according to claim 1, wherein each of the first downlighting devices is secured by a plastic snap bushing.

14. The mirror assembly for a vehicle according to claim 1, wherein each of the first downlighting devices is secured by a nut.

15. The mirror assembly for a vehicle according to claim 1, wherein the first downlighting devices are LED modules.

16. The mirror assembly for a vehicle according to claim 1, wherein the mirror head further comprising a housing and a mirror lens secured by the housing.

17. A mirror assembly for a vehicle, comprising:
a first clam shell including one or more first downlighting devices to illuminate areas or ground near the vehicle to enable a driver to visually determine a presence of a person or object;
a second clam shell configured to anchor the mirror assembly to the vehicle;
a supporting arm mounted to the first clam shell and the second clam shell; and
a mirror head configured to be mountable to the supporting arm.

18. The mirror assembly for a vehicle according to claim 17, wherein the supporting arm has an internal passage way for running an electrical wire, and wherein one or more second downlighting devices are wired to an electrical connector of the vehicle through the internal passage way of the supporting arm.

19. The mirror assembly for a vehicle according to claim 18, wherein the mirror head has one or more third downlighting devices.

20. The mirror assembly for a vehicle according to claim 19, wherein the one or more third downlighting devices are wired to the electrical connector of the vehicle through the internal passage way of the supporting arm.

* * * * *